(12) United States Patent
Gehrmann et al.

(10) Patent No.: US 9,055,427 B2
(45) Date of Patent: Jun. 9, 2015

(54) UPDATING CONFIGURATION PARAMETERS IN A MOBILE TERMINAL

(75) Inventors: Christian Gehrmann, Lund (SE); Ben Smeets, Dalby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 2485 days.

(21) Appl. No.: 11/718,947

(22) PCT Filed: Oct. 12, 2005

(86) PCT No.: PCT/EP2005/011012
§ 371 (c)(1),
(2), (4) Date: Nov. 5, 2007

(87) PCT Pub. No.: WO2006/053612
PCT Pub. Date: May 26, 2006

(65) Prior Publication Data
US 2008/0107269 A1 May 8, 2008

Related U.S. Application Data

(60) Provisional application No. 60/630,974, filed on Nov. 24, 2004.

(30) Foreign Application Priority Data

Nov. 17, 2004 (EP) ................................. 04388076
Feb. 22, 2005 (EP) ................................. 05388014

(51) Int. Cl.
| | |
|---|---|
| *H04L 29/00* | (2006.01) |
| *H04W 8/24* | (2009.01) |
| *H04L 29/06* | (2006.01) |
| *H04W 12/04* | (2009.01) |
| *H04W 12/06* | (2009.01) |
| *H04W 88/02* | (2009.01) |

(52) U.S. Cl.
CPC .......... *H04W 8/245* (2013.01); *H04L 63/0442* (2013.01); *H04L 63/126* (2013.01); *H04W 12/04* (2013.01); *H04W 12/06* (2013.01); *H04W 88/02* (2013.01)

(58) Field of Classification Search
USPC ................. 455/551, 435.1; 713/2, 200; 726/7
See application file for complete search history.

(56) References Cited

U.S. PATENT DOCUMENTS 6,697,637 B1 * 2/2004 Willey .......................... 455/551
7,370,350 B1 * 5/2008 Salowey .......................... 726/7
(Continued)

FOREIGN PATENT DOCUMENTS

EP 1 478 196 A 11/2004

*Primary Examiner* — Brandon Hoffman
*Assistant Examiner* — Helai Salehi

(57) ABSTRACT

A method of updating/recovering a configuration parameter of a mobile terminal having stored thereon a public key of a public-key cryptosystem and a current terminal identifier, the method comprising determining an updated configuration parameter by an update/recovery server in response to a received current terminal identifier from the mobile terminal; generating an update/recovery data package by a central signing server, the update/recovery data package including the current terminal identifier, the updated configuration parameter, and a digital signature based on a private key, where the digital signature is verifiable by said public key; storing the current terminal identifier and the updated configuration parameter by the central signing server; sending the update/recovery data package by the update/recovery server to the mobile terminal causing the mobile terminal to verify the received update/recovery data package and to store the! updated configuration parameter of the verified update/recovery data package in the mobile terminal.

25 Claims, 4 Drawing Sheets

(56) References Cited

U.S. PATENT DOCUMENTS

| | | |
|---|---|---|
| 2003/0027581 A1 | 2/2003 | Jokinen et al. |
| 2004/0111616 A1 | 6/2004 | Adi |
| 2005/0005161 A1* | 1/2005 | Baldwin ................ 713/200 |
| 2005/0079868 A1* | 4/2005 | Shankar et al. .......... 455/435.1 |
| 2005/0153741 A1 | 7/2005 | Chen et al. |
| 2005/0268084 A1* | 12/2005 | Adams et al. ................ 713/2 |

* cited by examiner

UPDATING CONFIGURATION PARAMETERS IN A MOBILE TERMINAL

This application claims the benefit of U.S. Provisional Application No. 60/630,974, filed Nov. 24, 2004, the disclosure of which is fully incorporated herein by reference.

This invention relates to the secure update of configuration parameters in a mobile terminal.

Mobile terminals are required to carry a unique hardware identity (ID) such as IMEI/ESN. The identity is used to trace a particular mobile terminal and can also be used to block the terminal from accessing the mobile network. Hence, malicious users are interested in modifying the unique ID of the terminal, and manufactures need to protect tampering of the terminal ID. Furthermore, it is also desirable to protect other security critical parameters of the terminal, for example SIM-lock codes etc. From a security point of view it would thus be desirable that security critical parameters are never changed after the terminal has left the factory, e.g. by writing the data in a One-Time-Programmable (OTP) portion of the memory of the mobile terminal, thereby preventing subsequent tempering with the data. However, in practice there are situations where this is not possible/desirable: For example, the flash memory of the mobile terminal where security sensitive parameters are stored may have been corrupted, or the hardware ID may need to be changed, because the terminal has a new owner and some existing user services might be connected to the terminal ID.

Hence, there is a need for a secure mechanism for updating security sensitive parameters in a mobile terminal, such as a mobile telephone, a pager, an electronic organiser, a smart phone, a personal digital assistant (PDAs), or the like.

U.S. Pat. No. 6,026,293 discloses a method for preventing electronic memory tampering in an electronic device. According to this prior art method, when the electronic device is to be reprogrammed by a data transfer device, the electronic device initiates a public/private key based challenge-response authentication scheme to authenticate the data transfer device. Once authenticated, the data transfer device is permitted access to reprogram the memory. Following the reprogramming of the memory, the electronic device performs a hash calculation of the modified memory contents. The calculated hash value is sent to the data transfer device for a digital signature, and the signed hash value is returned to the electronic device for storage. The signed hash value is subsequently used for auditing the integrity of the memory content, e.g. during boot-up or periodically.

Even though the above prior art method provides for an integrity protection of the stored data and security during the update process, it is a problem to provide a stricter control over the hardware IDs of mobile terminals.

Consequently, it is an object to provide an update method and system that allows a mobile terminal manufacturer to maintain strict control over the hardware IDs of the mobile terminal.

It is a further object to provide an efficient update procedure that allows a world-wide update of hardware IDs and/or other security sensitive parameters in a customer-friendly way.

The above and other problems are solved by a method of updating/recovering a configuration parameter of a mobile terminal, the mobile terminal having stored thereon a public key of a public-key cryptosystem and a current terminal identifier identifying said mobile terminal, the method comprising determining at least one updated configuration parameter by an update/recovery server in response to a received current terminal identifier from the mobile terminal;

generating an update/recovery data package by a central signing server, the update/recovery data package including the current terminal identifier, the at least one updated configuration parameter, and a digital signature based on a private key, where the digital signature is verifiable by said public key;

storing the current terminal identifier and the at least one updated configuration parameter by the central signing server;

sending the update/recovery data package by the update/recovery server to the mobile terminal causing the mobile terminal to verify the received update/recovery data package and to store the at least one updated configuration parameter of the verified update/recovery data package in the mobile terminal.

In particular, since the update procedure is performed by a number of decentralised update/recovery servers, an efficient update process is ensured while maintaining strict centralised control over the hardware ID via the central signing server.

Since the system allows a plurality of update/recovery servers, it is an advantage that a compromised update/recovery server can easily be blocked from future use without significantly reducing the efficiency of the update system as a whole, since there are still a number of alternative update/recovery servers operational.

It is a further advantage that a secure, strictly controlled update processes for the security sensitive parameters of a mobile terminal is provided.

Furthermore, if cloned mobile terminals appear on the market or terminals that are otherwise tampered with, the update process and system described herein allows an easy detection of the current hardware ID of the mobile terminal and/or the identity of the update/recovery server used to change the hardware ID of the terminal. Hence, it is an advantage that the method described herein facilitates an easy tracing of illegal tampering with the mobile terminal and dishonest service centres for mobile terminals.

It is a further advantage that, once an update/recovery package is sent to a terminal, the logging of the data prevents a reuse of that package in a replay attack.

The term update/recovery server is intended to include any computer or other data processing system that is adapted to update the hardware ID and/or other security sensitive parameters of a mobile terminal and/or adapted to recover a corrupted hardware ID and/or other security sensitive parameters of a mobile terminal. The term signing server is intended to include any suitably programmed/configured computer or other data processing system.

The term configuration parameter is intended to include any parameter stored in the mobile terminal, in particular any data item for which a secure update procedure is desirable. In the following such configuration parameters will also be referred to as security parameters. In particular, the term configuration parameter comprises a hardware identifier identifying the mobile terminal, e.g. an IMEI and an ESN. The IMEI (International Mobile Equipment Identity) is a unique number given to every mobile phone. A list of all IMEIs on the network is stored in an Equipment Identity Register (EIR). The ESN (Electronic Serial Number) is a unique serial number used in the United States and given to a handset at the time of manufacture. Further examples of security-sensitive configuration parameters include SIM-lock codes, phone domains, root certificates, security policies, etc.

In one embodiment, the method further comprises comparing, by the central signing server, at least one of the current terminal identifier and a generated updated terminal identifier with an ID repository to determine whether the corresponding current or updated terminal identifier is blocked. Hence, the method provides a protection against unauthorised updates of previously invalidated terminal IDs e.g. in order to circumvent the black-listing of a stolen terminal.

According to one embodiment, the method further comprises sending the current terminal identifier and the at least one updated configuration parameter by the update/recovery server to the signings server.

In one embodiment, the method further comprises receiving an indication from the mobile terminal that the current terminal identifier is corrupted; and receiving a pseudo terminal identifier generated by the mobile terminal as the current terminal identifier. Consequently, the method provides a secure and efficient process for recovering mobile terminals with corrupted configuration parameters, i.e. mobile terminals that can no longer access one or more of its configuration parameters.

In another embodiment, the pseudo terminal identifier is a message authentication code value calculated from a device dependant key of the mobile terminal. It is an advantage that the mobile terminal subsequently can verify the pseudo terminal identifier when receiving a recovery package and, thus, may accept an updated/recovered ID only, if the mobile terminal has detected that the current ID is corrupted.

In yet another embodiment, the method further comprises receiving a random number from the mobile terminal by the update/recovery server; and generating an update/recovery data package comprises including the random number in the digital signature of the update/recovery data package. Consequently, due to the random number, a previously issued recovery package cannot be used in a replay attack.

When the method further comprises verification by the central signing server whether the update/recovery server is authorised to update the mobile terminal, a mechanism is provided for detecting unauthorised update/recovery servers which may then easily be blocked from future use, thereby facilitating the prevention of dishonest service centres for mobile terminals.

When the update/recovery data package comprises a digital certificate certifying the holder of the private key of the update/recovery data package, the security is further increased, because the update/recovery server and/or the mobile terminal can verify the authenticity of the update/recovery data package. In one embodiment, the digital certificate comprises an update/recovery flag indicating that the holder of the private key is authorised to update/recover the mobile terminal with the at least one updated configuration parameter. Alternatively or additionally, the digital certificate comprises a manufacturer identifier identifying a manufacturer of the mobile terminal, allowing the mobile terminal to compare the manufacturer identifier with a corresponding manufacturer identifier stored in the mobile terminal.

In yet another embodiment, the sending of the update/recovery data package by the update/recovery server to the mobile terminal further causes the mobile terminal to generate and store a message authentication code of the received at least one updated configuration parameter. Consequently, the received updated configuration parameter is stored integrity protected, thereby facilitating a subsequent verification of the integrity of the stored parameter by the mobile terminal.

In yet another embodiment, the method further comprises sending a loader program to the mobile terminal, said loader program being adapted, when executed on the mobile terminal, to perform at least the generating of said message authentication code of the received at least one updated configuration parameter. Hence, the calculation of the reference message authentication code for use during a subsequent memory audit is performed by software that does not normally reside on the mobile terminal, thereby reducing the risk of a hacker or other malicious user gaining access to that functionality. While the reference message authentication code is made available for storage by the program calculating it, the subsequent audit process does not need to output the calculated audit message authentication code but merely a result of the comparison with the stored reference code.

In an alternative embodiment, at least the generation of the message authentication code of the received at least one updated configuration parameter and/or the verification of the update package is performed by protected boot ROM (Read Only Memory) code or integrity-protected boot code of the mobile terminal.

It is noted that the features of the method described above and in the following may be implemented in software and carried out on a data processing system comprising one or more processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

The present invention can be implemented in different ways including the method described above and in the following, corresponding devices, and computer programs, each yielding one or more of the benefits and advantages described in connection with the above-mentioned method, and each having one or more embodiments corresponding to the embodiments described in connection with the above-mentioned method.

More specifically, according to a further aspect, the above problems are solved by a system for updating/recovering a configuration parameter of a mobile terminal, the mobile terminal having stored thereon a public key of a public-key cryptosystem and a current terminal identifier identifying said mobile terminal, the system comprising at least one update/recovery server adapted to determine at least one updated configuration parameter in response to a received current terminal identifier from the mobile terminal; and a central signing server adapted to generate an update/recovery data package including the current terminal identifier, the at least one updated configuration parameter, and a digital signature based on a private key, where the digital signature is verifiable by said public key; and to store the current terminal identifier and the at least one updated configuration parameter by the central signing server;

the update/recovery server being further adapted to send the update/recovery data package to the mobile terminal causing the mobile terminal to verify the received update/recovery data package and to store the at least one updated configuration parameter of the verified update/recovery data package in the mobile terminal.

In one embodiment, the update/recovery server and the signing server are connected via a secure communications link.

According to a yet further aspect, the above problems are solved by a signing server for updating/recovering a configuration parameter of a mobile terminal, the mobile terminal having stored thereon a public key of a public-key cryptosystem and a current terminal identifier identifying said mobile terminal, wherein the signing server is configured to receive at least one updated configuration parameter generated by an update/recovery server in response to a received current terminal identifier from the mobile terminal;

to generate an update/recovery data package including the current terminal identifier, the at least one updated configuration parameter, and a digital signature based on a private key, where the digital signature is verifiable by said public key;

to store the current terminal identifier and the at least one updated configuration parameter; and to send the update/recovery data package to the update/recovery server causing the update/recovery server to forward the update/recovery data package to the mobile terminal and causing the mobile terminal to verify the received update/recovery data package and to store the at least one updated configuration parameter of the verified update/recovery data package in the mobile terminal.

In one embodiment, the signing server is further adapted to compare at least one of the current terminal identifier and a generated updated terminal identifier with an ID repository to determine whether the corresponding current or updated terminal identifier is blocked.

In another embodiment, the signing server is further adapted to verify whether the update/recovery server is authorised to update the mobile terminal.

According to a yet further aspect, the above problems are solved by an update/recovery server for updating/recovering a configuration parameter of a mobile terminal, the mobile terminal having stored thereon a public key of a public-key cryptosystem and a current terminal identifier identifying said mobile terminal, wherein the update/recovery server is configured to generate at least one updated configuration parameter in response to a received current terminal identifier from the mobile terminal;

to send the current terminal identifier and the at least one updated configuration parameter to a signing server causing the signing server to generate an update/recovery data package including the current terminal identifier, the at least one updated configuration parameter, and a digital signature based on a private key, where the digital signature is verifiable by said public key, and to store the current terminal identifier and the at least one updated configuration parameter by the central signing server;

to receive the update/recovery data package from the signing server; and to send the update/recovery data package to the mobile terminal to cause the mobile terminal to verify the received update/recovery data package and to store the at least one updated configuration parameter of the verified update/recovery data package in the mobile terminal.

In one embodiment, the update/recovery server is further adapted to receive an indication from the mobile terminal that the current terminal identifier is corrupted; and to receive a pseudo terminal identifier generated by the mobile terminal as the current terminal identifier.

In one embodiment, the pseudo terminal identifier is a message authentication code value calculated from a device dependant key of the mobile terminal.

In one embodiment, the update/recovery server is further adapted to receive a random number from the mobile terminal; and to include the random number in the digital signature of the update/recovery data package.

In one embodiment, the update/recovery server is further adapted to send a loader program to the mobile terminal, said loader program being adapted, when executed on the mobile terminal, to perform at least a generating of a message authentication code of the received at least one updated configuration parameter.

According to a yet further aspect, the above problems are solved by a computer program product comprising computer program code means adapted to perform the steps of the method described above and in the following, when said computer program is run on the data processing system. In particular, the computer program product may comprise respective computer program code modules to be executed on the update/recovery server and on the signing server.

For example, the program code means may be loaded in a memory, such as a Random Access Memory (RAM), from a storage medium or from another computer via a computer network. Alternatively, the described features may be implemented by hardwired circuitry instead of software or in combination with software.

According to a yet further aspect, the above problems are solved by a data processing system configured to perform the steps of the method described above and in the following.

The above and other aspects will be apparent and elucidated from the embodiments described in the following with reference to the drawing in which.

Figure 1:
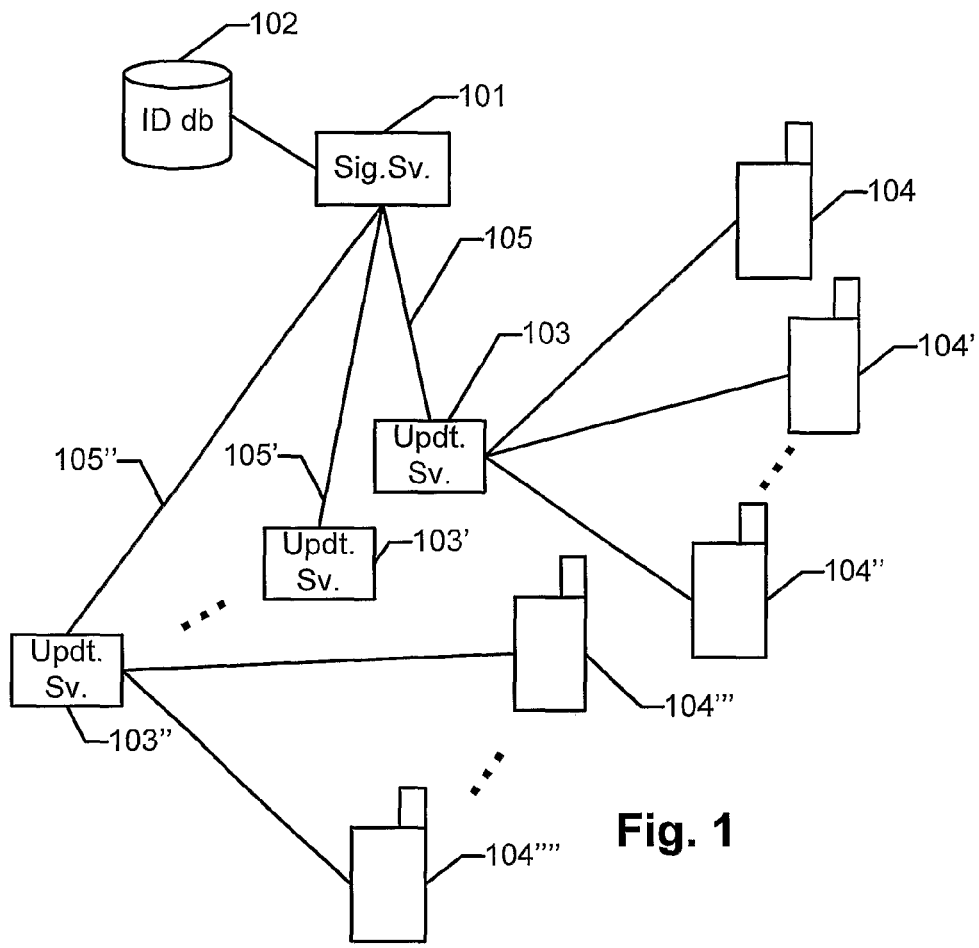
FIG. 1 shows a schematic block diagram of a system for updating/recovering configuration parameters of a mobile terminal.

FIG. 1 shows a schematic block diagram of a system for updating/recovering configuration parameters of a mobile terminal. The system comprises a central signing server 101 with access to an ID repository 102, and a number of update/recovery servers 103, 103', and 103'''.

In FIG. 1, three update/recovery servers are shown as an example. However, it will be appreciated that a different number of update/recovery servers is possible. The update/recovery servers 103, 103', and 103" perform the update of hardware IDs and/or other security parameters of mobile terminals and/or the recovery of corrupted hardware IDs and/or other security parameters. It is understood that each server 103, 103', 103" may be adapted to perform both parameter updates and parameter recoveries, i.e. they may have the role of an update server and of a recovery server. In some embodiments, however, some or all servers may act only as either an update server or a recovery server. In the present description, the terms update server and recovery server are merely used in order to illustrate the role of the respective server. Use of the term update server is not intended to imply that the server is only adapted to perform parameter updates. Similarly, use of the term recovery server is not intended to imply that the server is only adapted to perform parameter recoveries.

The ID repository 102 may be a database separate from the signing server or it may be an internal database of the signing server, e.g. an internal signing log storage. When a single signing server handles all updates of terminals from the same manufacturer, a strict centralised control is provided. However, a system with a small number of signing servers, e.g. 2, 3, or 4, is possible as well. In this case, the signing servers may have access to the same ID repository or to synchronised repositories. In one embodiment, the ID repository 102 for logging updates of the hardware IDs is collocated with the EIR. Each signing server is responsible for generating update/recovery packages for a plurality of update/recovery servers, thereby providing an efficient system allowing the servicing of a large number of mobile terminals.

Each update/recovery server can communicate with one or more mobile terminals at the same time. In the example of FIG. 1, three mobile terminals 104, 104', and 104" are shown in communication with update/recovery server 103, and two mobile terminals 104''' and 104'''' in communication with update/recovery server 103". It is understood that the signing server may be integrated with one of the update/recovery servers, e.g. one server computer may function both as the central signing server and as one of the update/recovery servers.

The update/recovery servers communicate with the mobile terminals via a suitable communications link. For example, the update/recovery servers may communicate with the mobile terminals over-the-air, i.e. via a cellular telecommunications network. In other embodiments an update/recovery server may communicate with a mobile terminal via a local communications link, e.g. a short range wireless communications channel, such as a radio-based channel, e.g. Bluetooth, or an infrared communications channel, e.g. IrDa. Furthermore, the update/recovery server may communicate with a mobile terminal via a wired connection, e.g. a serial port such as USB, FireWire, or the like.

The update/recovery servers communicate with the signing server via respective communications channels 105, 105', 105". The connection may be a local connection, e.g. a Local Area Network (LAN), a Wireless Local area Network (WLAN), or the like, or a remote connection, e.g. via the Internet or another communications network. When the connection between the update/recovery server and the signing server is confidentiality and integrity protected and/or when a mutual authentication between the update and signing server takes place, the security of the system is increased, in particular if a remote connection is used. For example, the connection between the update/recovery server and the signing server may utilise TLS (Transport Layer Security) with server and client authentication or another suitably secure protocol.

Figure 2:
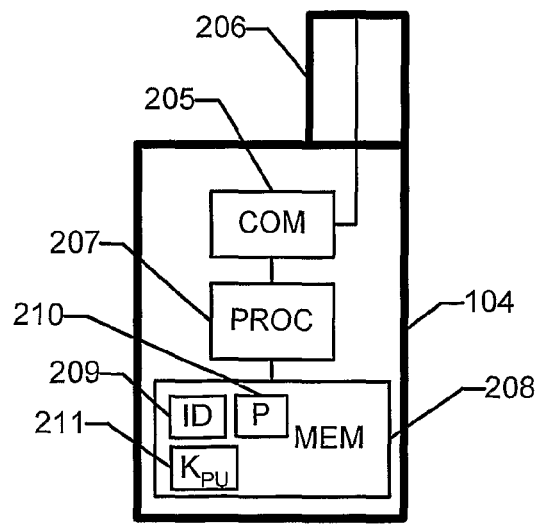
FIG. 2 shows a schematic block diagram of an example of a mobile terminal.

FIG. 2 shows a schematic block diagram of an example of a mobile terminal. The mobile terminal 104 comprises a communications circuit 206 and an antenna connected to the communications circuit for communicating via a cellular telecommunications network, e.g. a GSM network, GPRS network, a UMTS network, or any other suitable communications network. Additionally, the mobile terminal 104 may comprise further data communications interfaces, e.g. an IrDa port, a serial interface e.g. USB, Firewire, or the like, a Bluetooth interface, and/or the like. The mobile terminal 104 further comprises a processing unit 207 and a memory 208. The memory 208 may comprise one or more physically and/or logically separated memory sections. For example, the mobile terminal may comprise a RAM and one or more non-volatile memory/memories, e.g. a ROM and a re-writable memory, e.g. a flash memory.

The mobile terminal 104 is pre-configured with a public root key 211 of a public-key cryptosystem. The key 211 may be stored in a protected non-volatile memory such as a ROM, thereby providing a high level of security.

The key is used to check the correctness of all updates or recovery of the security critical parameters of the terminal 104.

Furthermore, the terminal 104 has stored thereon a unique hardware ID 209 such as an IMEI (International Mobile Equipment Identifier) and/or an ESN (Electronic Serial Number). In addition to the hardware ID 209, the mobile terminal may have stored thereon other security sensitive parameters 210 such as a SIM-unlock code and/or the like. The hardware ID 209 and the optional further parameters 210 are stored protected in a terminal non-volatile memory that can be rewritten. The data may be protected with a hash value, a message authentication code, or the like, e.g. as described in U.S. Pat. No. 6,026,293 where the mobile terminal microprocessor performs a hash calculation on the content of the terminal memory to derive an audit hash value, which is compared with a securely stored or a digitally signed pre-calculated hash value. Only if the two hash values agree, the memory content is accepted. For example, such an authentication code may be checked each time the terminal boots and if the check fails, the terminal will not run with full functionality.

In the following two scenarios will be described with reference to FIGS. 3 and 4, respectively: The update of terminal security parameters and a security parameters recovery procedure in case the parameters of a mobile terminal are corrupted and/or unreadable.

Figure 3:
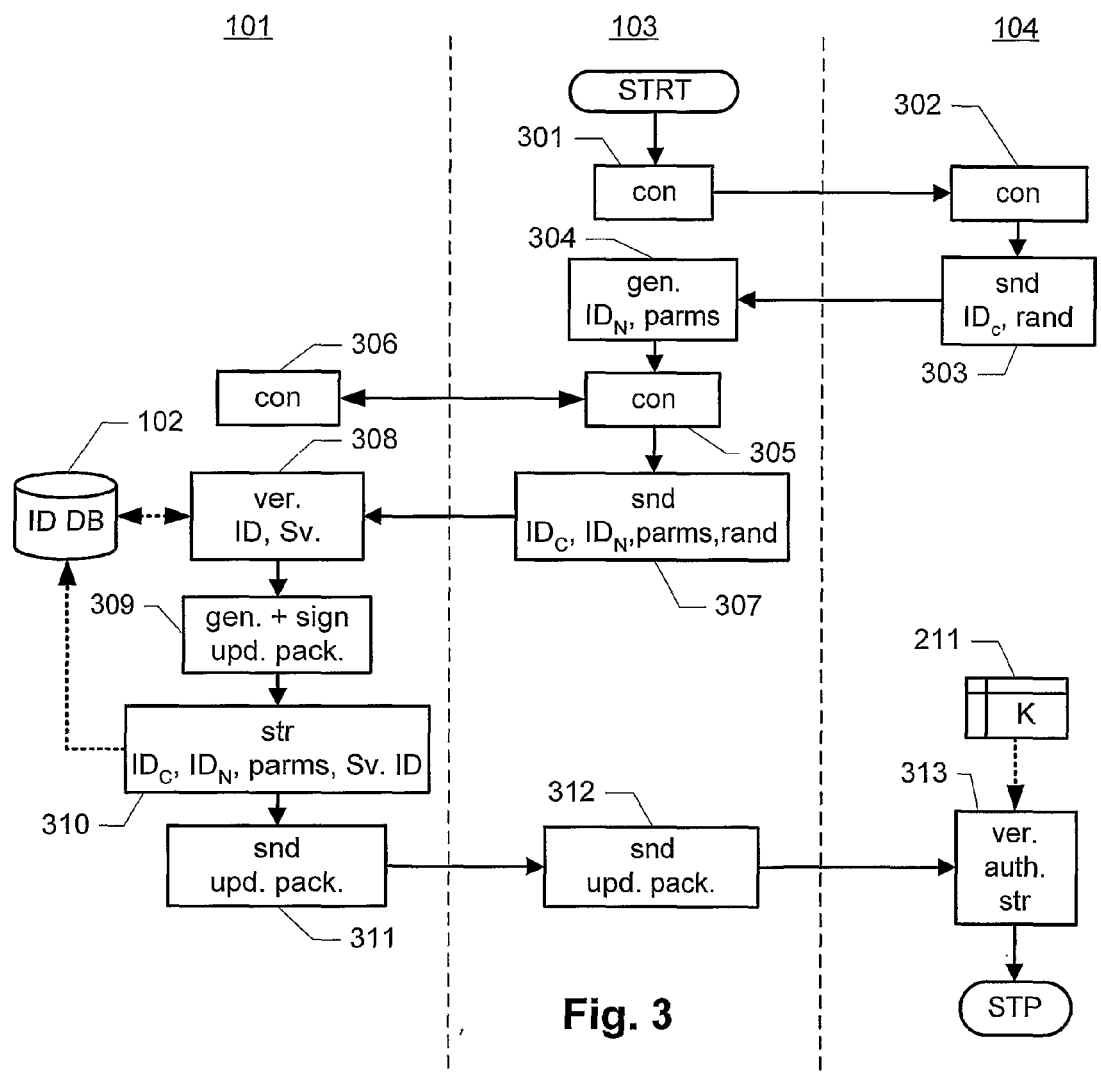
FIG. 3 shows a flow diagram of an embodiment of a method for updating configuration parameters of a mobile terminal.

FIG. 3 shows a flow diagram of an embodiment of a method for updating configuration parameters of a mobile terminal 104 by an update server 103. In this embodiment, the server 103 will be referred to as an update server. It is understood however, that this terminology merely refers to a server role in the update/recovery process. It will be recognised that the same server computer may act both as update as well as recovery server.

In initial steps 301 and 302 performed by the update server 103 and the mobile terminal 104, respectively, the update server and the mobile terminal establish a local or remote, wired or wireless, connection with each other. In some embodiments, the update server initiates this process, while in other embodiments the terminal connects to the update server. As part of step 301, the update server 103 sends an update request to the terminal 104.

In step 303, the mobile terminal 104 returns the current hardware ID, designated $ID_C$, and, optionally, the current values of further security parameters to the update server 104. The mobile terminal 104 generates and also sends a random value rand to the update server.

In step 304, the update server 103 chooses the new terminal parameters, i.e. the new hardware ID, designated $ID_N$, and/or new values of the other security parameters. Typically, the update server selects the new parameters in response to an input from a user of the update server, e.g. an operator at a service location. The actual selection of parameters may be performed by the update server under control of the user, or the updated parameters may be entered by the user. For example, the update server may select a new hardware ID from a pool of available IDs if a new hardware ID is requested by the user in connection with a change in subscription. In another scenario the mobile terminal may be transferred from one phone domain (e.g. type of phone, product, R&D) to another, e.g. for test purposes. In this scenario, the domain parameters of the mobile terminal are changed accordingly by the update server upon request from the operator. It is understood that a parameter update may include an update of the hardware ID or it may merely be an update of other security sensitive parameters while maintaining the hardware ID constant.

In steps 305 and 306 performed by the update server 103 and a signing server 101, respectively, a connection is established between the update server 103 and the signing server 101 (unless the signing server is collocated with the update server) via a suitable communications channel, e.g. as described in connection with FIG. 1 above.

In step 307, the update server 103 sends the new and current values of the hardware ID and the corresponding current and new values of the security parameters to the signing server 101 together with the random value rand received from the mobile terminal 104.

In step 308, the signing server 101 checks that the update server 103 is authorized to perform a terminal update. In particular, the signing server verifies the current (and optionally the new) hardware ID of the terminal. To this end, the signing server 101 includes functionality for blocking updates of certain IDs, e.g. by maintaining a list of blocked IDs. Hence, the verification of the new and/or current ID(s) may include a comparison of the new and/or current ID(s) with the IDs on the list of blocked IDs. If the update server is authorized for updates and if the requested current terminal or new terminal ID is not blocked, the signing server proceeds with the updating procedure at step 309; otherwise the process is aborted.

In step 309, the signing server 101 creates a signed update package with the new terminal security parameters. The signed update package includes the new terminal parameters including the new terminal hardware ID as well as the current terminal hardware ID. In some embodiments, the package further includes a digital certificate. The update package is signed with a signature based either on the private key corresponding to the public root key 211 in the mobile terminal or a private key that is certified through a private key corresponding to the public root key 211 in the terminal. Furthermore, in some embodiments, the certificate certifying the signing key contains an update flag that indicates that the holder of the private key is authorized to perform a security parameter update. The certificate may also include a field with the ID of the manufacturer of the mobile terminal. When the signature is computed including the random value rand, replay attacks are prevented.

In step 310, the signing server 101 stores the new parameters, the terminal ID(s) (current and possible new ID) and the update server identity in the ID repository 102.

In subsequent step 311, the signing server 101 sends the signed update package back to the upgrade server 103.

In step 312, the upgrade server 103 sends the received update package to the mobile terminal 104.

In step 313, the mobile terminal 104 receives the update package from the update server 103. Upon receipt of the update package, the mobile terminal checks the certificate and signature of the update package using its public root key 211. If the certificate contains an update flag field and/or a manufacturer field, this/these fields are also checked. To this end, the terminal may have the ID of its manufacturer stored in, for example, an OTP memory. Next, the terminal checks the current hardware ID in the update package against its own current ID. If the two values agree, the terminal proceeds with the update. The old security parameters are deleted from the memory and the new parameters are stored in the terminal memory. The new ID and parameters may be securely stored in a terminal non-volatile memory.

In embodiments in which the security parameters stored on the mobile terminal are protected with an authentication code, the mobile terminal calculates a corresponding authentication code (MAC) of the received new parameters and stores the authentication code together with the new parameters.

Figure 4:
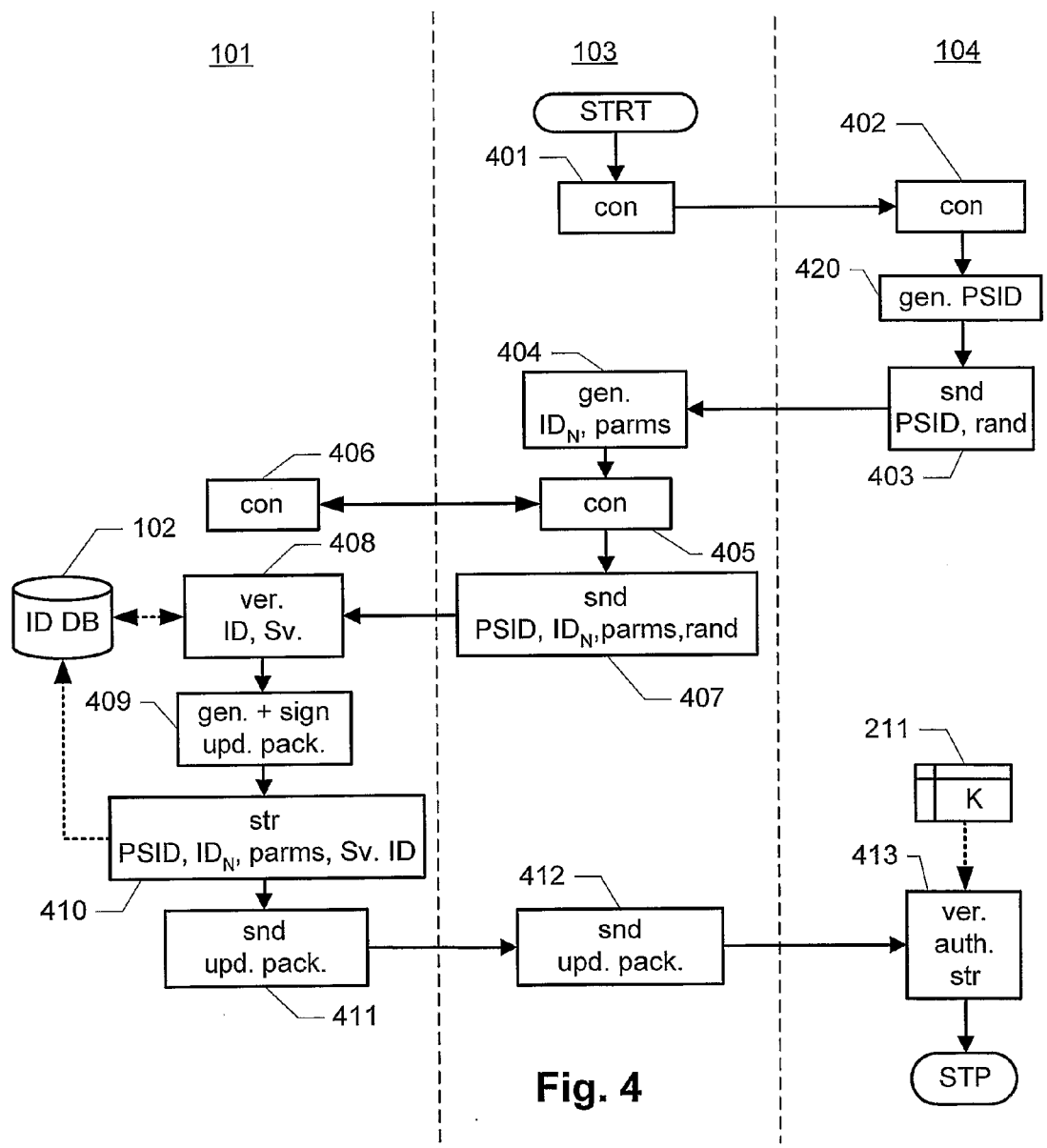
FIG. 4 shows a flow diagram of an embodiment of a method for recovering corrupted configuration parameters of a mobile terminal.

FIG. 4 shows a flow diagram of an embodiment of a method for recovering corrupted configuration parameters of a mobile terminal. Hence, in this scenario it is assumed that one or more of the security sensitive parameters of the mobile terminal are corrupted, i.e. cannot be retrieved by the mobile terminal any longer. In this embodiment, the server 103 will be referred to as a recovery server. It is understood however, that this terminology merely refers to a server role in the update/recovery process. It will be recognised that the same server computer may act both as update as well as recovery server.

In initial steps 401 and 402 performed by the recovery server 103 and the mobile terminal 104, respectively, the recovery server and the mobile terminal establish a local or remote, wired or wireless, connection with each other. In some embodiments, the recovery server initiates this process, while in other embodiments the terminal connects to the recovery server.

It is understood that a parameter recovery may include a recovery of the hardware ID or it may merely be a recovery of other security sensitive parameters while maintaining the hardware ID constant. In the following, it is assumed that the hardware ID is unreadable. It is understood that the recovery process is performed analogously in the case of other security parameters being corrupted.

In step 420, the mobile terminal generates a random value rand and a pseudo identity PSID defined as PSID=DEVMAC (rand), where DEVMAC is a MAC using a device dependent key. For example, the device dependant key, may be a unique key for the chipset of the mobile terminal, e.g. a key that is programmed during production. When the device dependant key is stored such that it cannot be extracted from the chip, the security of the generation of the PSID is further increased.

In subsequent step 403, the mobile terminal 104 sends a status message to the recovery server 103 indicating that one or more security parameters are unreadable (or if they are not, abort the process). The mobile terminal also sends the random value rand and the pseudo identity PSID to the recovery server 103.

In step 404, the recovery server 103 chooses the new terminal parameters, i.e. the new hardware ID, designated $ID_N$, and optionally new values of the other security parameters, e.g. as described above. In some embodiments the hardware ID and/or some or all of the other parameters may be recovered from a suitable database.

In steps 405 and 406 performed by the recovery server 103 and a signing server 101, respectively, a connection is established between the recovery server 103 and the signing server 101 (unless the signing server is collocated with the recovery server) via a suitable communications channel, e.g. as described in connection with FIG. 1 above.

In step 407, the recovery server 103 sends the new hardware ID and the pseudo identifier PSID and optionally new and current values of the other security parameters to the signing server 101 together the random value rand received from the mobile terminal 104.

In step 408, the signing server 101 checks that the recovery server 103 is authorized to perform a terminal recovery. In particular, the signing server verifies the new hardware ID of the terminal. To this end, the signing server 101 includes functionality for blocking updates to certain IDs, e.g. by maintaining a list of blocked IDs. For example, some ranges of IDs are used in phones where the ID is programmed in one-time-programmable memory. Accordingly, in some embodiments it may be desirable to block updates to IDs from these ranges. Hence, the verification of the new ID may include a comparison of the new ID with the IDs on the list of blocked IDs. If the recovery server is authorized for recovery and if the requested new terminal ID is not blocked, the signing server proceeds with the recovery procedure at step 409; otherwise the process is aborted.

In step 409, the signing server 101 creates a signed recovery package with the new terminal security parameters. The signed recovery package includes the new terminal parameters as well as the pseudo identifier PSID. In some embodiments, the package further includes a digital certificate. The recovery package is signed with a signature based either on the private key corresponding to the public root key 211 in the mobile terminal or a private key that is certified through a private key corresponding to the public root key 211 in the terminal. Furthermore, in some embodiments, the certificate certifying the signing key contains a recovery flag that indicates that the holder of the private key is authorized to perform a security parameter recovery. The certificate may also include a field with the ID of the manufacturer of the mobile terminal. When the signature is computed including the random value rand, replay attacks are prevented.

In step 410, the signing server 101 stores the new terminal ID, the pseudo identifier and optionally the new parameters together with the identity of the recovery server in the ID repository 102.

In subsequent step 411, the signing server 101 sends the signed recovery package back to the recovery server 103.

In step 412, the recovery server 103 sends the received recovery package to the mobile terminal 104.

In step 413, the mobile terminal 104 receives the recovery package from the recovery server 103. Upon receipt of the recovery package, the mobile terminal checks the certificate and signature of the recovery package using its public root key 211. If the certificate contains a recovery flag field and/or a manufacturer field, this/these fields are also checked. To this end, the terminal may have the ID of its manufacturer stored in, for example, an OTP memory. Next, the terminal checks the pseudo identifier PSID received in the recovery package against the PSID generated by it in step 420. If the two values agree, the terminal proceeds with the recovery. The new hardware ID and optionally further parameters are stored in the terminal memory. For example, the new ID and parameters are securely stored in a terminal non-volatile memory.

In embodiments in which the security parameters stored on the mobile terminal are protected with an authentication code, the mobile terminal calculates a corresponding message authentication code (MAC) of the received new parameters and stores the message authentication code (MAC) together with the new parameters.

In some situations the mobile terminal may not be able to contact the server, e.g. because the current terminal identity has been blacklisted, or because the device is malfunctioning and is sent in for repair. Furthermore, when the steps 313 and 413 include a recalculation of a message authentication code (MAC) as described above, it may be disadvantageous from a security point of view to have the MAC recalculation capability available as part of the normal software stored in the mobile terminal.

The above problems are solved when the update/recovery server initially sends a trusted loader software to the mobile terminal and when the loader software subsequently performs the communication and some or all of the further steps to be taken in the mobile terminal, in particular the calculation of the MAC. An embodiment of an update process utilising a loader software will now be described with reference to FIG. 5.

Figure 5:
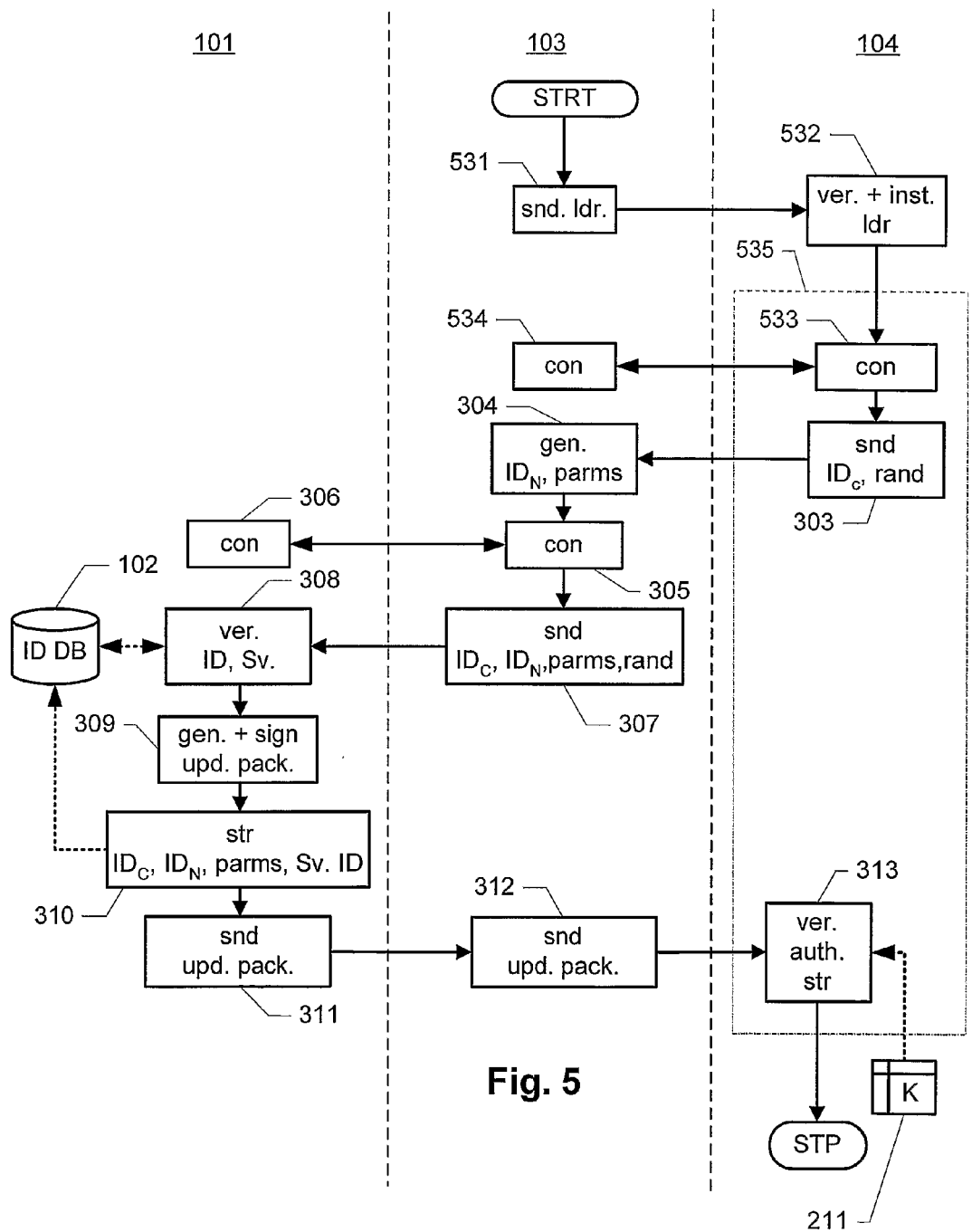
FIG. 5 shows a flow diagram of another embodiment of a method for updating/recovering corrupted configuration parameters of a mobile terminal.

FIG. 5 shows a flow diagram of another embodiment of a method for updating configuration parameters of a mobile terminal. The method of FIG. 5 is similar to the method described in connection with FIG. 3, but with an initial loading stage of the loader software. It is understood that a recovery process of FIG. 4 may be modified in the same way in order to utilise a loader software.

In initial step 531, an update server 103 sends a loader software to the mobile terminal 104. This trusted loader includes functionality adapted to recalculate the MAC value of the updated parameters. Methods for loading software into a mobile terminal are known and will not be described here in detail. In one embodiment the loader software is digitally signed with a secret private key and the matching public key is stored integrity protected in the mobile terminal. For example, the public key may be stored in ROM or in one-time-programmable memory of the digital ASIC of the mobile terminal. Accordingly, in step 532 upon receipt of the loader software, the mobile terminal verifies the authenticity of the received loader.

Subsequently, the mobile terminal executes the loader software, and the loader software establishes a communications link with the update server (steps 533 and 534 performed by the update server and by the mobile terminal under the control of the loader software, respectively).

The remaining steps 303-313 are identical to the corresponding steps described in connection with FIG. 3 and will not be described again here. In the embodiment of FIG. 5, the steps 533, 303, and 313 performed by the mobile terminal are performed by, or under the control of, the loader software, as indicated by the dashed-dotted line 535.

Hence, in this embodiment, the security of the update process is increased, since, the MAC recalculation capability is only available as part of the loader software that does not normally reside on the mobile terminal. Furthermore, when also the remaining updating steps on the mobile terminal are performed by the loader software, the updating process may be performed even in situations when the mobile terminal software is not able to perform the update any longer.

Although some embodiments have been described and shown in detail, the invention is not restricted to them, but may also be embodied in other ways within the scope of the subject matter defined in the following claims.

In particular, the embodiments have mainly been described with reference to a mobile terminal as an example of a data processing device. It is understood, however, that the described method, system, devices, and product means may also applied to other data processing devices having security critical configuration parameters that require updating.

The invention can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of updating/recovering a configuration parameter of a mobile terminal, the mobile terminal having stored thereon a public key of a public-key cryptosystem and a current terminal identifier identifying said mobile terminal, the method comprising:
    determining at least one updated configuration parameter by an update/recovery server in response to a received current terminal identifier from the mobile terminal;
    sending the current terminal identifier and the at least one updated configuration parameter by the update/recovery server to a central signing server;
    generating an update/recovery data package by the central signing server, the update/recovery data package including the current terminal identifier, the at least one updated configuration parameter, and a digital signature based on a private key, where the digital signature is verifiable by said public key;
    storing the current terminal identifier and the at least one updated configuration parameter by the central signing server;
    sending the update/recovery data package by the update/recovery server to the mobile terminal; and
    causing the mobile terminal to verify the received update/recovery data package and to store the at least one updated configuration parameter of the verified update/recovery data package in the mobile terminal.

2. The method according to claim 1, wherein the at least one updated configuration parameter includes an updated terminal identifier.

3. The method according to claim 1, wherein the current terminal identifier comprises at least one of an International Mobile Equipment Identity (IMEI) number or Electronic Serial Number (ESN).

4. The method according to claim 1, further comprising comparing, by the central signing server, at least one of the current terminal identifier and a generated updated terminal identifier with an ID repository to determine whether the corresponding current or updated terminal identifier is blocked.

5. The method according to claim 1, further comprising:
    receiving an indication from the mobile terminal that the current terminal identifier is corrupted; and
    receiving a pseudo terminal identifier generated by the mobile terminal as the current terminal identifier.

6. The method according to claim 1, further comprising:
    receiving a random number from the mobile terminal by the update/recovery server; and
    wherein generating an update/recovery data package comprises including the random number in the digital signature of the update/recovery data package.

7. The method according to claim 1, further comprising verifying, by the central signing server, whether the update/recovery server is authorized to update the mobile terminal.

8. The method according to claim 1, wherein the update/recovery data package comprises a digital certificate certifying the holder of the private key of the update/recovery data package.

9. The method according to claim 1, wherein sending the update/recovery data package by the update/recovery server to the mobile terminal further causes the mobile terminal to generate and store a message authentication code of the received at least one updated configuration parameter.

10. The method of claim 1, further comprising being implemented in a computer program product comprising computer program code means adapted to perform when run on a data processing system.

11. The method of claim 1, further comprising being implemented in a data processing system.

12. The method according to claim 5, wherein the pseudo terminal identifier is a message authentication code value calculated from a device dependant key of the mobile terminal.

13. The method according to claim 8, wherein the digital certificate comprises an update/recovery flag indicating that the holder of the private key is authorized to update/recover the mobile terminal with the at least one updated configuration parameter.

14. The method according to claim 9, further comprising sending a loader program to the mobile terminal, said loader program being adapted, when executed on the mobile terminal, to perform at least a generating of said message authentication code of the received at least one updated configuration parameter.

15. The method according to claim 13, wherein the digital certificate comprises a manufacturer identifier identifying a manufacturer of the mobile terminal, allowing the mobile terminal to compare the manufacturer identifier with a corresponding manufacturer identifier stored in the mobile terminal.

16. A system for updating/recovering a configuration parameter of a mobile terminal, the mobile terminal having stored thereon a public key of a public-key cryptosystem and a current terminal identifier identifying said mobile terminal, the system comprising:
    at least one update/recovery server adapted to (i) determine at least one updated configuration parameter in response to a received current terminal identifier from the mobile terminal and (ii) send the current terminal identifier and the at least one updated configuration parameter to a central signing server; and
    the central signing server adapted to (i) generate an update/recovery data package including the current terminal identifier, the at least one updated configuration parameter, and a digital signature based on a private key, where the digital signature is verifiable by said public key and (ii) store the current terminal identifier and the at least one updated configuration parameter by the central signing server; and
    the update/recovery server being further adapted to (i) send the update/recovery data package to the mobile terminal causing the mobile terminal to verify the received update/recovery data package and (ii) store the at least one updated configuration parameter of the verified update/recovery data package in the mobile terminal.

17. The system according to claim 16, wherein the update/recovery server and the signing server are connected via a secure communications link.

18. A signing server for updating/recovering a configuration parameter of a mobile terminal, the mobile terminal having stored thereon a public key of a public-key cryptosystem and a current terminal identifier identifying said mobile terminal, the signing server comprising:
    means to receive, from an update/recovery server, a current terminal identifier and at least one updated configuration parameter generated by the update/recovery server in response to receiving the current terminal identifier from the mobile terminal;
    means to generate an update/recovery data package including the current terminal identifier, the at least one updated configuration parameter, and a digital signature based on a private key, where the digital signature is verifiable by said public key;

means to store the current terminal identifier and the at least one updated configuration parameter; and means to send the update/recovery data package to the update/recovery server causing the update/recovery server to forward the update/recovery data package to the mobile terminal and causing the mobile terminal to verify the received update/recovery data package and to store the at least one updated configuration parameter of the verified update/recovery data package in the mobile terminal.

19. The signing server according to claim 18, further adapted to compare at least one of the current terminal identifier and a generated updated terminal identifier with an ID repository to determine whether the corresponding current or updated terminal identifier is blocked.

20. The signing server according to claim 18, further adapted to verify whether the update/recovery server is authorized to update the mobile terminal.

21. An update/recovery server for updating/recovering a configuration parameter of a mobile terminal, the mobile terminal having stored thereon a public key of a public-key cryptosystem and a current terminal identifier identifying said mobile terminal, the update/recovery server comprising:

means to generate at least one updated configuration parameter in response to a received current terminal identifier from the mobile terminal;

means to send the current terminal identifier and the at least one updated configuration parameter to a signing server causing the signing server to generate an update/recovery data package including the current terminal identifier, the at least one updated configuration parameter, and a digital signature based on a private key, where the digital signature is verifiable by said public key, and to store the current terminal identifier and the at least one updated configuration parameter by the central signing server;

means to receive the update/recovery data package from the signing server; and means to send the update/recovery data package to the mobile terminal to cause the mobile terminal to verify the received update/recovery data package and to store the at least one updated configuration parameter of the verified update/recovery data package in the mobile terminal.

22. The update/recovery server according to claim 21, further adapted to receive an indication from the mobile terminal that the current terminal identifier is corrupted; and to receive a pseudo terminal identifier generated by the mobile terminal as the current terminal identifier.

23. The update/recovery server according to claim 21, further adapted to receive a random number from the mobile terminal; and to include the random number in the digital signature of the update/recovery data package.

24. The update/recovery server according to claim 21, further adapted to send a loader program to the mobile terminal, said loader program being adapted, when executed on the mobile terminal, to perform at least a generating of a message authentication code of the received at least one updated configuration parameter.

25. The update/recovery server according to claim 22, wherein the pseudo terminal identifier is a message authentication code value calculated from a device dependant key of the mobile terminal.

* * * * *